United States Patent [19]

Porter

[11] 3,886,369

[45] May 27, 1975

[54] SOLID-STATE GATING CIRCUIT FOR CROSS-POINT SWITCHING

[75] Inventor: Virgle E. Porter, Sieger, Ill.

[73] Assignee: The Sippican Corporation, Midlothian, Ill.

[22] Filed: Feb. 11, 1974

[21] Appl. No.: 441,407

[52] U.S. Cl. ............ 250/551; 250/209; 179/18 GF; 307/117

[51] Int. Cl. ............ H01j 39/12

[58] Field of Search ........ 250/551, 209; 179/18 GF; 307/315, 117

[56] References Cited

UNITED STATES PATENTS

| | | | |
|---|---|---|---|
| 3,346,811 | 10/1967 | Perry et al. | 250/551 X |
| 3,492,488 | 1/1970 | Goettelmann | 307/117 X |
| 3,504,131 | 3/1970 | Slana et al. | 178/18 GF |
| 3,524,986 | 8/1970 | Harnden, Jr. | 250/551 X |
| 3,599,202 | 8/1971 | DeVey | 307/315 X |
| 3,693,060 | 9/1972 | Joyce | 307/117 |

*Primary Examiner*—Walter Stolwein

*Attorney, Agent, or Firm*—Hume, Clement, Brinks, Willian, Olds & Cook, Ltd.

[57] ABSTRACT

A solid-state gating circuit used as a cross-point switch for opening a signal circuit in a telephone network is disclosed. The gating circuit includes a light emitting diode connected in series with an isolation diode, and a by-pass path coupled to a point between the light emitting diode and the isolation diode. When a voltage pulse is applied through the light emitting diode, means in the by-pass path cause the isolation diode to be reverse-biased, thereby causing current to flow from the light emitting diode through the by-pass path instead of through the isolation diode. As current flows through the light emitting diode, light therefrom causes a photo-sensitive transistor in the signal circuit to conduct, thereby closing the signal circuit to permit electrical information to pass therethrough with minimal interference from spurious signals developed in the telephone network.

14 Claims, 1 Drawing Figure

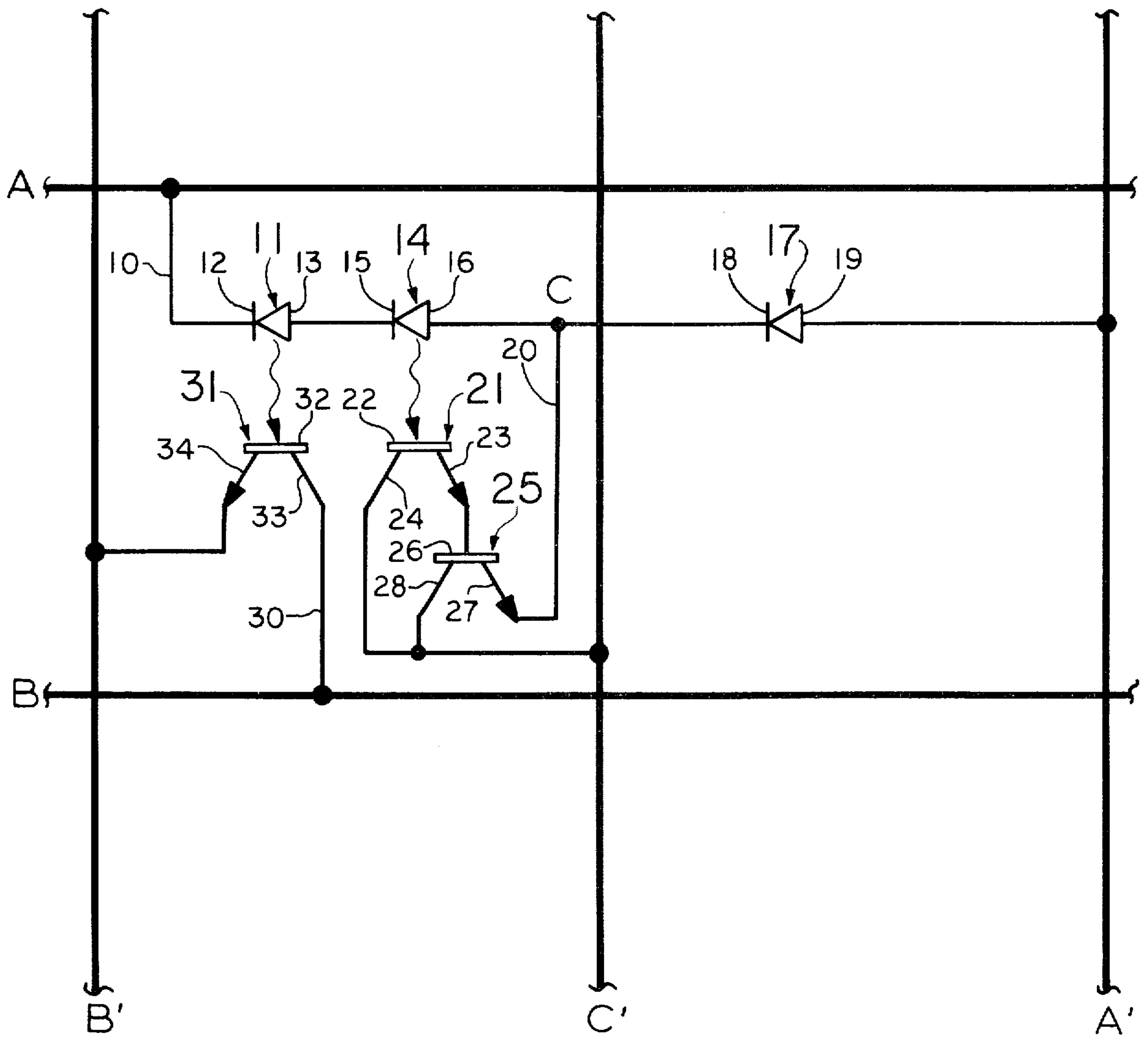
A
B
B'
C'
A'
C
10
11
12
13
14
15
16
17
18
19
20
21
22
23
24
25
26
27
28
30
31
32
33
34

SOLID-STATE GATING CIRCUIT FOR CROSS-POINT SWITCHING

BACKGROUND OF THE INVENTION

This invention relates to a gating circuit having control means for opening a signal circuit at desired times. The gating circuit of the invention finds particular application as cross-point switching means in a telephone circuit matrix of the type described in Virgle E. Porter's U.S. Pat. No. 3,557,317 entitled "Telephone Switchboard With Universal Line/Trunk Circuits." In the past, gating circuits in general and cross-point switches in particular have utilized both solid-state and electro-mechanical devices for opening and closing the switching circuits as desired.

Because of the rapid switching times required in telephone networks, and the prodigious number of signals being passed simultaneously, voltage transients and other spurious signals are frequently developed. These spurious signals sometimes undesirably disconnect a properly closed signal circuit or erroneously close an open signal circuit, and are therefore very troublesome. Gating circuits which utilize solid-state switching devices, such as thyristors, have been largely unsuccessful in completely eliminating the troublesome results arising from the presence of spurious signals in the telephone network.

Electro-mechanical devices, such as glass reed switches, generally provide sufficient electrical isolation between the control means and the signal circuits to prevent the adverse effects arising from the presence of spurious signals, but are subject to other drawbacks. In particular, glass reed switches generally have higher power requirements, are less durable, and are of larger size than solid-state devices. In addition, reed switches, unlike solid-state devices which have no moving parts, are more likely to fail.

The gating circuit of the invention provides control means having a circuit isolation diode and light emitting means used for energizing a photo-sensitive transistor in the signal circuit. When energized, the photo-sensitive transistor closes the signal circuit, thereby permitting electrical information to be passed therethrough. The circuit of the invention further includes a by-pass path having means for reverse-biasing the isolation diode in order to isolate the isolation diode, and circuitry connected thereto, from the rest of the gating circuit while still permitting current flow through the light emitting means in order to maintain the photo-sensitive transistor in an energized condition. The invention thus permits all of the benefits of circuit isolation normally associated with reed switches, without any of the concomitant drawbacks thereof.

OBJECTS OF THE INVENTION AND BRIEF DESCRIPTION OF THE DRAWING

It is the primary object of this invention to provide an improved gating circuit.

It is another object of this invention to provide an improved solid-state gating circuit.

It is a further object of this invention to provide solid-state cross-point switching means capable of improved circuit isolation.

Other objects, features and advantages of this invention will be apparent upon reference to the single accompanying drawing showing a circuit diagram of the gating circuit of the invention operating as a cross-point switch in a telephone switching network.

DETAILED DESCRIPTION OF AN EXEMPLARY EMBODIMENT OF THE INVENTION

The gating circuit diagramed in the accompanying drawing is shown to be part of a telephone switching network comprising horizontal conductors A and B, and vertical conductors A', B', and C'. The intersection of conductors A and B with conductors A', B', and C' defines a single cross-point. Conventional telephone networks typically include numerous cross-points, the accompanying drawing being limited to a single cross-point for purposes of clarity and simplicity only.

Control means comprising a first light emitting diode 11, a second light emitting diode 14 and an isolation diode 17 are coupled in series between horizontal conductor A and vertical conductor A' to define a control path 10. First light emitting diode 11 has a cathode 12 connected to horizontal conductor A and an anode 13, and second light emitting diode 14 has a cathode 15 connected to anode 13 and an anode 16. When current flows through diodes 11 and 14, light is emitted therefrom in a manner well-known in the art. Isolation diode 17, has a cathode 18 connected through a point C to anode 16, and anode 19 connected to vertical conductor A'.

A first normally nonconducting photo-sensitive transistor 21, having a base 22, an emitter 23 and a collector 24, is disposed in optical relationship with diode 14 so that light emitted therefrom impinges upon base 22. A normally nonconductive transistor 25, has a base 26 connected to emitter 23 of transistor 21, an emitter 27 connected to point C on control path 10, and a collector 28 connected to both collector 24 of transistor 21 and vertical conductor C'. Photo-sensitive transistor 21 and transistor 25 thus form a Darlington pair, and as explained more fully hereinafter, the circuitry from point C, through the Darlington pair, to vertical conductor C' forms a by-pass path 20 for current blocked by isolation diode 17. Vertical conductor C' is switchably connected to a source of positive voltage (not shown).

A second photo-sensitive transistor 31 has a base 32, a collector 33 connected to horizontal conductor B, and an emitter connected to vertical conductor B'. Transistor 31 is disposed in optical relationship with diode 11 so that light emitted therefrom impinges upon base 32. The circuitry from horizontal conductor B through transistor 31, to vertical conductor B' forms a signal path 30 for permitting the passage of electrical information.

Though there are many alternative modes in which the above-described circuit may operate, the perferred manner of operation is as follows. A relatively minimal potential, often referred to as ground, is placed on vertical conductor A'. Thereafter, when a request to pass electrical information is made, a temporary control signal in the form of a negative voltage pulse is applied to horizontal conductor A. Since vertical conductor A' is now positive relative to horizontal conductor A, diodes 11, 14, and 17 are forward biased, thereby allowing current to flow through control path 10 for the duration of the control signal.

As current flows through diodes 11 and 14, light is emitted therefrom in a well-known manner. Since photo-sensitive transistor 21 is optically aligned with diode 14, the light emitted therefrom impinges upon base 22 causing transistor 21 to conduct. When transistor 21 becomes conductive, normally nonconductive transistor 25 also conducts, thereby providing a closed current path between vertical conductor C′ and point C. Since vertical conductor C′ is connected to a source of positive voltage, point C is rendered positive relative to ground when the Darlington pair comprising transistors 21 and 25 are conducting.

When point C becomes positive relative to ground, cathode 18 of isolation diode 17 becomes positive relative to anode 19, thereby reverse-biasing isolation diode 17. Isolation diode 17 thus blocks current passing from horizontal conductor A, through control path 10 to vertical conductor A′. Anodes 16 and 13 of diodes 14 and 11, respectively, remain positive relative to corresponding cathodes 15 and 12, however, causing diodes 14 and 11 to remain forward-biased. This enables current to flow from horizontal conductor A to point C, and then through by-pass path 20 to vertical conductor C′. As long as current flows through diode 14, light continues to energize photo-sensitive transistor 21, thereby causing the Darlington pair to conduct, and isolation diode 17 to remain reversed-biased. It should be apparent that this condition exists even after the temporary control signal applied to horizontal conductor A has expired.

As current flows from horizontal conductor A along by-pass path 20 to vertical conductor C′, and in particular as current flows through diode 11, light is continuously emitted therefrom, causing normally nonconducting photo-sensitive transistor 31 to become conductive. When transistor 31 conducts, signal path 30 is closed permitting electrical information to pass freely between horizontal conductor B and vertical conductor B′.

Signal path 30 can be re-opened simply by grounding vertical conductor C′, thereby causing current to stop flowing through diodes 11 and 14. When this condition occurs, light is no longer passed to photo-sensitive transistor 31, thereby returning transistor 31 to its nonconducting state. At the same time, light ceases to be emitted from diode 14, thereby returning transistors 21 and 25 to their nonconducting states as well.

From the detailed description recited hereinabove, it should be clear that signal path 30 is at all times electrically isolated from the rest of the circuit, thereby substantially eliminating unwanted signals from interferring with the electrical information passed between horizontal conductor B and vertical conductor B′. In addition, diodes 11 and 14 are electrically isolated from vertical conductor A′ when signal path 30 is closed, thereby reducing the possibility of spurious signals erroneously opening or closing signal path 30.

It should also be clear that numerous circuit combinations which may differ from the specific embodiment herein described, but which do not depart from the true spirit of the invention can be devised. Accordingly, the invention should not be limited to any one particular embodiment, but should be given the full breadth as defined in the appended claims.

I claim:

1. A gating circuit comprising:

control means, having circuit isolation means and light emitting means for producing light energy when current passes through said light emitting means;

a by-pass path, having first photo-sensitive switching means disposed in optical relationship with said light emitting means for energizing said circuit isolation means upon receipt of light energy from said light emitting means; said circuit isolation means, upon energization, causing current passing through said light emitting means to be diverted to said by-pass path; and signal circuit means, electrically isolated from said control means, and said by-pass means, having second photosensitive switching means disposed in optical relationship with said light emitting means for electrically closing said signal circuit means upon receipt of said light energy from said light emitting means.

2. The gating circuit set forth in claim 1 wherein said circuit isolation means is a solid-state diode.

3. The gating circuit set forth in claim 1 wherein said light emitting means include at least one light emitting diode.

4. The gating circuit set forth in claim 1 wherein said first photo-sensitive switching means is a photo-sensitive transistor.

5. The gating circuit set forth in claim 1 wherein said second photo-sensitive switching means includes a photo-sensitive transistor.

6. The gating circuit set forth in claim 5 wherein said first photo-sensitive switching means further include a transistor, coupled to said photo-sensitive transistor to form a Darlington pair.

7. A gating circuit comprising:

control means, having an isolation diode and a light emitting diode for producing light energy when current passes therethrough;

an electrical conductor, susceptible to receiving spurious signals, coupled through said circuit isolation means to said light emitting means;

a by-pass path, having a first photo-sensitive transistor disposed in optical relationship with said light emitting diode for energizing said isolation diode upon receipt of light energy from said light emitting diode; said isolation diode, upon energization, causing current passing through said light emitting diode to be diverted to said by-pass path; and a signal circuit, electrically isolated from said control means, said by-pass path and said electrical conductor, having a second photo-sensitive transistor disposed in optical relationship with said light emitting diode for electrically closing said signal circuit upon receipt of said light energy from said light emitting diode, whereby said light emitting means are electrically isolated from said electrical conductor upon energization of said circuit isolation means.

8. The gating circuit set forth in claim 7 wherein said by-pass path further includes a transistor, coupled to said first photo-sensitive transistor to form a Darlington pair.

9. A cross-point for use in a telephone switching circuit comprising:

a control path having circuit isolation means and light emitting means for producing light energy when current passes through said light emitting means;

an electrical conductor, susceptible to receiving spurious signals, adapted to pass current through said control path upon receipt of a control signal;

a by-pass path having first photo-sensitive switching means disposed in optical relationship with said light emitting means for energizing said circuit isolation means; said circuit isolation means, upon energization, blocking current flow therethrough;

a signal path, electrically isolated from said control path, said by-pass path and said electrical conductor, having second photo-sensitive switching means disposed in optical relationship with said light emitting means for electrically closing said signal path upon receipt of said light energy from said light emitting means; and a voltage source coupled to said by-pass path, for passing current through said light emitting means upon termination of said control signal.

10. The cross-point set forth in claim 9 wherein said circuit isolation means is a diode.

11. The cross-point set forth in claim 9 wherein said light emitting means include at least one light emitting diode.

12. The cross-point set forth in claim 9 wherein said second photo-sensitive switching means is a photo-sensitive transistor.

13. The cross-point set forth in claim 9 wherein said first photo-sensitive switching means includes a photo-sensitive transistor.

14. The cross-point set forth in claim 13 wherein said first photo-sensitive switching means further include a transistor, coupled to said photo-sensitive transistor to form a Darlington pair.

* * * * *